United States Patent [19]

Willinger et al.

[11] 3,738,494

[45] June 12, 1973

[54] DISPOSABLE FILTRATION CARTRIDGE

[75] Inventors: Allan H. Willinger, New Rochelle; Albert J. Dinnerstein, Far Rockaway, both of N.Y.; Avihu Kagan, Union, N.J.

[73] Assignee: Metaframe Corporation, Maywood, N.J.

[22] Filed: Sept. 20, 1971

[21] Appl. No.: 182,050

[52] U.S. Cl. .................................. 210/169, 210/238
[51] Int. Cl. ............................................... E04h 3/20
[58] Field of Search ............................. 210/169, 238

[56] References Cited
UNITED STATES PATENTS

| | | | |
|---|---|---|---|
| 3,643,801 | 2/1972 | Zelenko | 210/169 |
| 3,540,591 | 1/1970 | Yamazaki | 210/169 |
| 3,540,593 | 11/1970 | Stewart | 210/169 |
| 3,525,435 | 8/1970 | Conner, Jr. | 210/169 |

Primary Examiner—Samih N. Zaharna
Assistant Examiner—T. A. Granger
Attorney—Friedman & Goodman

[57] ABSTRACT

A disposable filtration cartridge comprising a casing, and filtration materials confined in the casing for cleansing debris-laden fluid. The casing includes a lid integral therewith and displaceable generally pivotally relative to the casing for exposing the filtration materials to debris-laden fluid. The casing, furthermore, includes an apertured bottom portion through which cleansed fluid may egress into a cleansed fluid chamber provided in an aquarium filtration housing.

7 Claims, 8 Drawing Figures

ALLAN H. WILLINGER
ALBERT J. DINNERSTEIN
AVIHU KAGAN
INVENTORS

BY Friedman and Goodman
ATTORNEYS

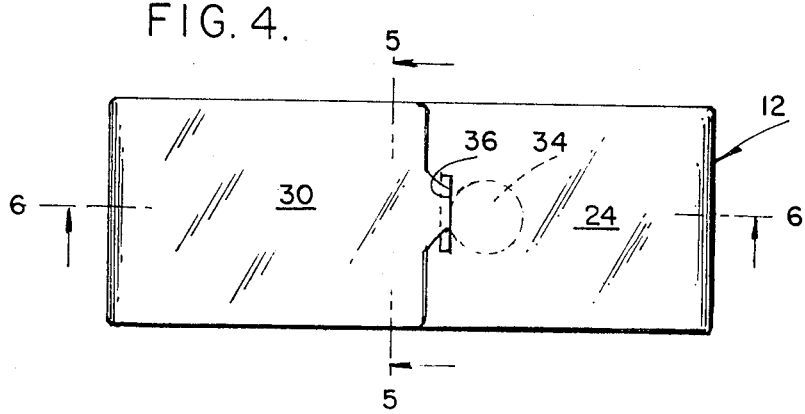
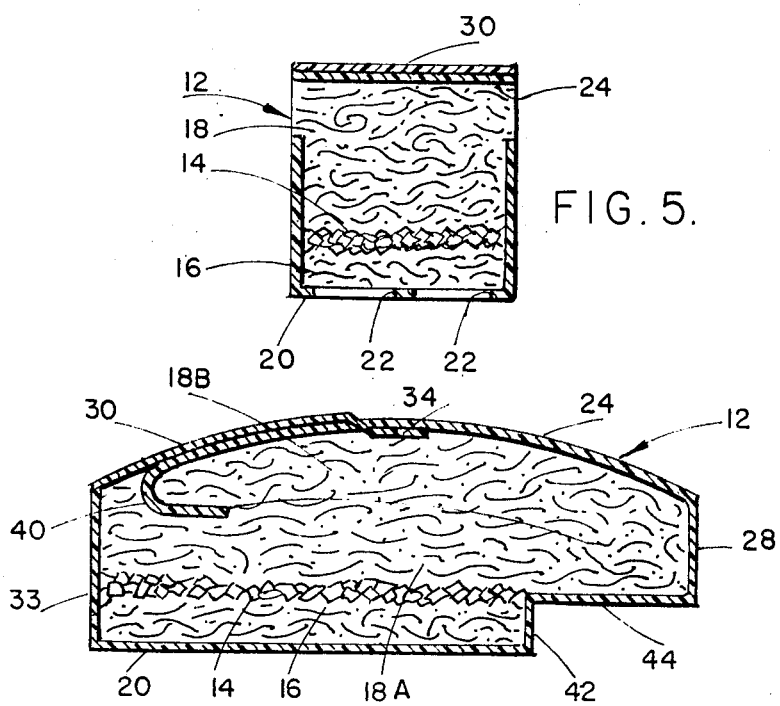

ALLAN H. WILLINGER
ALBERT J. DINNERSTEIN
AVIHU KAGAN
INVENTORS
BY Friedman and Goodman
ATTORNEYS

DISPOSABLE FILTRATION CARTRIDGE

BACKGROUND OF THE INVENTION

The present invention relates generally to accessories for a fish tank aquarium, and more particularly to a disposable filtration cartridge which may be inserted into a filtration housing for cleansing debris-laden fluid.

Generally speaking, filtration housings usually incorporate an apertured partition for dividing the housing into a first chamber for receiving debris-laden fluid and a second chamber communicating with the first chamber into which cleansed fluid may pass from filtering materials extending along the partition in the first chamber. In this respect, the filtering materials may be generally constituted of a dissolved material adsorbing means such as charcoal and a particle trapping means such as plastic wool or the like, and the conventional manner of arranging the filtering materials is simply to deposit the charcoal and plastic wool randomly along the partition in the first chamber to be constrained solely by the walls of the filtration housing.

Clearly, as those skilled in the art readily understand, filtering materials, after a period of time, must be replaced with substitute filtering materials since, in fact, after a particular period, the filtering materials which entrap debris become clogged, thereby, delimiting the capacity thereof to cleanse debris-laden fluid. Obviously, since the filtering materials, such as the charcoal and plastic wool, extend freely along the partition in the first chamber, it is often an extremely difficult and dirty process to remove the debris-laden and clogged filtering materials from the filtration housing.

Furthermore, as those skilled in the art readily understand, the plastic wool generally blackens and accumulates an odor due to the debris it entraps, and there is little means for the hobbyist to recognize that the filtering materials require replacement other than by the eventually sustained black color of the plastic wool and the odor emitted thereby. Thus, the conventional type of filtration housing is not provided with adequate means for indicating that the filtration materials require replacement.

SUMMARY OF THE INVENTION

Accordingly, it is an object of the present invention to provide a disposable filtration cartridge in which is provided filtration means for cleansing debris-laden water, the entire cartridge being adapted for placement and substitution in a filtration housing for cleansing debris-laden water syphoned thereinto.

It is another object of the present invention to provide a disposable filtration cartridge having means for permitting simple removal thereof from a filtration housing without the necessity for overturning the entire housing for spilling-out the filtration materials.

It is still a further object of the present invention to provide a disposable filtration cartridge which incorporates means for indicating that the materials and the entire package, therefor, require replacement after becoming extensively debris-laden.

To this end, the present invention relates generally to the combination of a filtration housing and a disposable filtration cartridge, the filtration housing being divided into a debris-laden fluid chamber and a cleansed fluid chamber communicating with one another through the intermediary of an apertured partition upon which rests the disposable filtration cartridge, the latter which comprises a casing, and a filtration means confined in said casing for cleansing debris-laden fluid, said casing including means for exposing said filtration means to debris-laden fluid, and an apertured portion through which cleansed fluid egresses.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 4 illustrates a top side plan view of the filtration cartridge;

FIG. 5 illustrates a cross-sectional view taken along the line 5—5 in FIG. 4;

FIG. 6 illustrates a cross-sectional view taken along the line 6—6 in FIG. 4;

DETAILED DESCRIPTION OF THE INVENTION

Figure 1:
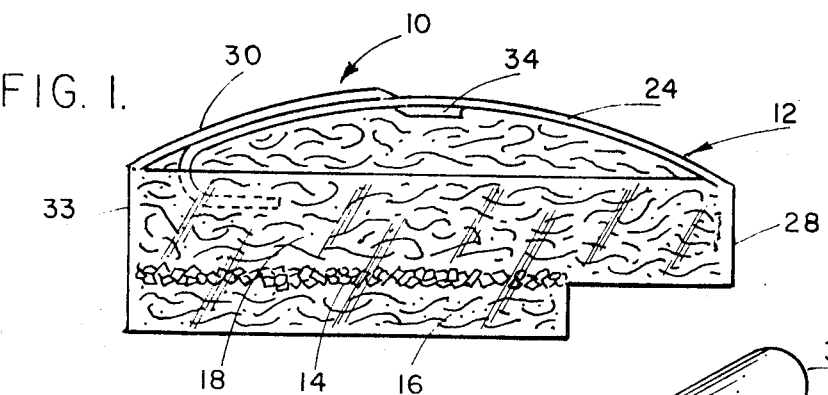
FIG. 1 illustrates a front elevational view of the disposable filtration cartridge pursuant to the present invention.

Referring now to the drawings and more particularly to FIGS. 1-7 thereof, the present invention relates generally to a disposable filtration cartridge denoted generally by the reference character 10. The filtration cartridge 10 includes a casing 12 which is constituted generally of a flexible thin-gauge transparent plastic which may be preferably vacuum-formed or the like. The casing 12 is provided internally thereof with filtration materials defined by means for adsorbing dissolved materials such as a layer of charcoal particles 14, a lower filtration layer of porous or fibrous material 16, such as plastic wool or foam plastic, and an upper filtration layer 18 such as plastic wool or the like.

The casing 12, moreover, includes an apertured bottom portion 20 which is provided with openings or perforations 22 or the like, upon which bottom portion 20 rests the lower filtration layer of plastic wool 16. A lid 24 is generally pivotally displaceable along a pivotal axis 26 which is intermediate the lid 24 and a right side wall 28 of the casing 12. The pivotal displacement of the lid 24 is permitted primarily because of the flexible nature of the plastic casing 12. At the opposite side of the casing 12 is a closure flap 30 which is pivotally displaceable along a pivotal axis 32 which is intermediate the closure flap 30 and a left side wall 33 of the casing 12. The closure flap 30 terminates in a free end tab 34 which is insertable into a slot 36 provided in the lid 24 such that the closure flap 30 overlies the lid 24 and detachably maintains the latter in a closed position overlying the upper filtration layer 18 of plastic wool. Clearly, the lower layer of plastic wool 16 prevents the charcoal particles 14 from spilling out of the casing 12 through the perforations 22 in the bottom portion 20 thereof.

Figure 2:
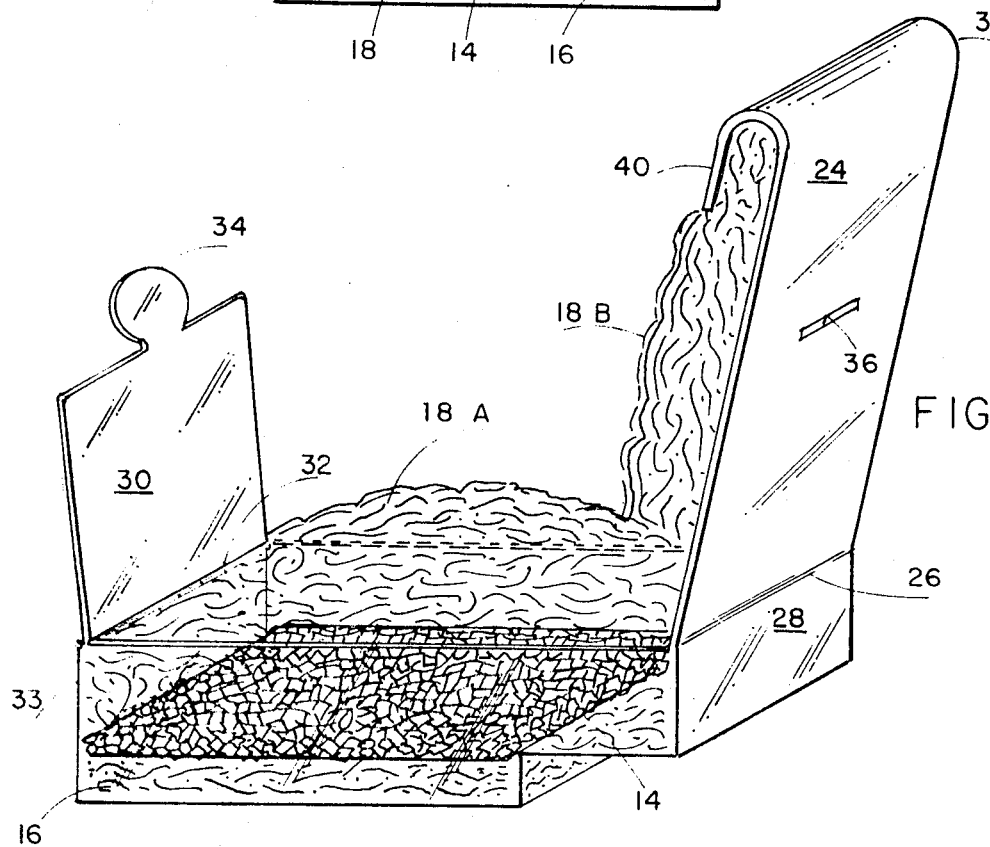
FIG. 2 illustrates a perspective view of the disposable filtration cartridge, wherein the lid thereof is opened for exposing the filtration materials to the environment.
Figure 3:
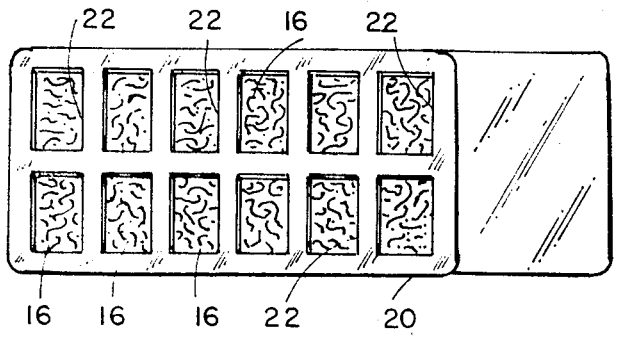
FIG. 3 illustrates an underside plan view of the filtration cartridge.
Figure 7:
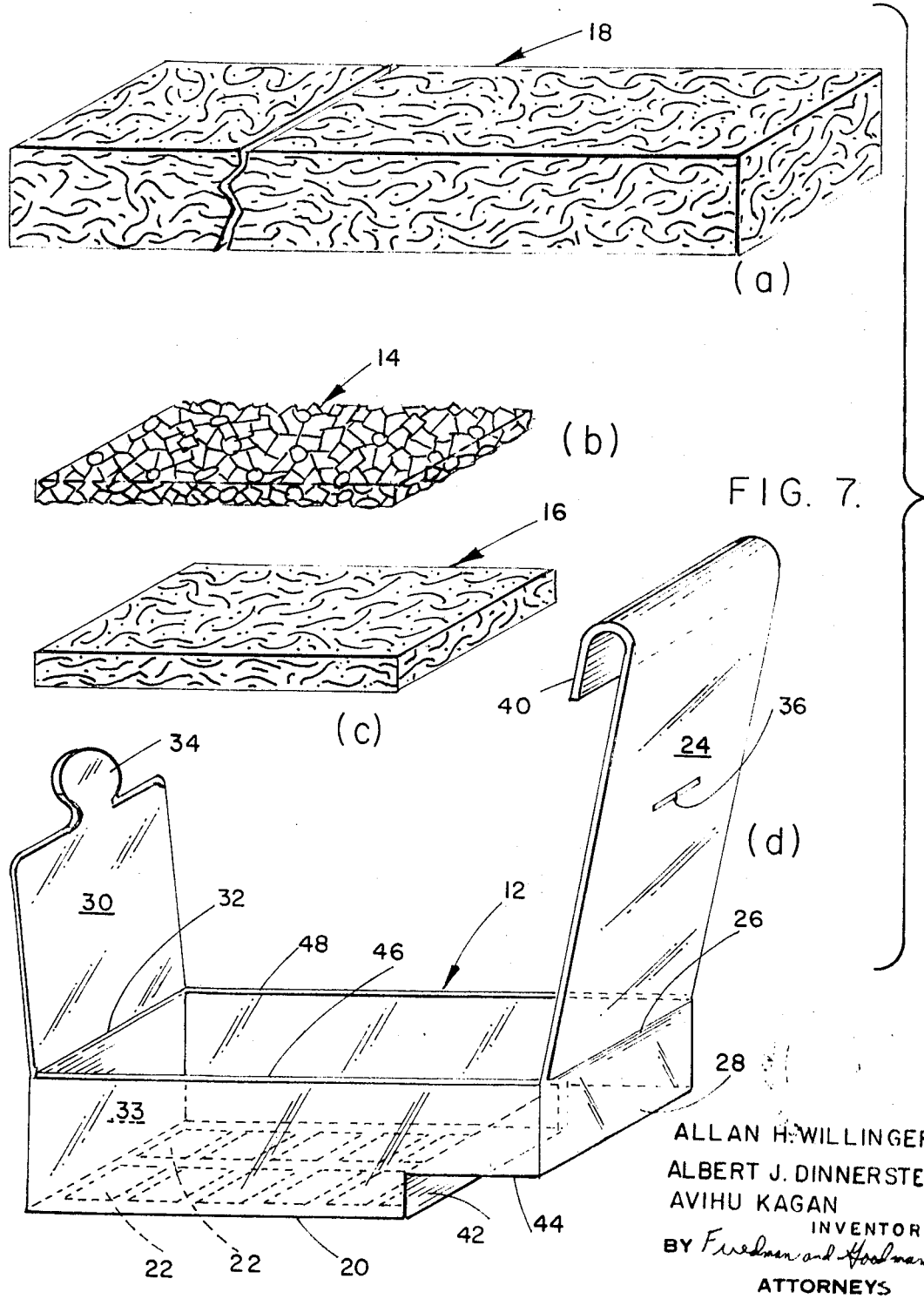
FIG. 7 illustrates an exploded perspective view of the filtration cartridge and contents therein.

As illustrated in FIGS. 1 and 2, the thickness of the upper filtration layer of plastic wool 18 is such so as to cause the interlocked lid 24 and closure flap 30 to bulge upwardly since, in fact, the upper filtration layer of plastic wool 18 is constituted of generally two portions 18A and 18B respectively which may be folded into overlying relation with one another and have a combined longitudinal extent which is substantially greater than the distance between side walls 28 and 33.

As illustrated in FIG. 2, the lid 24 terminates in a free end portion 38 which is generally U-shaped and provided with a free lip which overlies and secures, as by conventional means, one end of the portion 18B of the upper filtration layer of plastic wool 18. Moreover, because of the thickness of the upper filtration layer of plastic wool 18 and the manner by which the portion 18B thereof is secured to the lid 24, there is a tendency for the upper filtration layer of plastic wool 18 to cause the lid 24 to raise relative to the portion 18A of the upper filtration layer of plastic wool 18 when the tab 34 is removed from the slot 36 provided in the lid 24. The tendency is for the lid 24 to be moved into an open position as illustrated in FIG. 2, and the significance of same will be further clarified below.

As illustrated in FIG. 6, the casing 12 includes an intermediary external side wall 42 which extends generally vertically and a ledge 44 which is horizontal in nature and raised relative to the perforated bottom portion 20 of the casing 12. The intermediary external side wall 42 and the ledge 44 have a common lateral extent with that of the perforated bottom portion 20, and extend between a front wall 46 and rear wall 48 in a manner as illustrated generally in FIG. 7. The significance of the lateral extent between the front wall 46 and rear wall 48 will be further clarified below.

Figure 8:
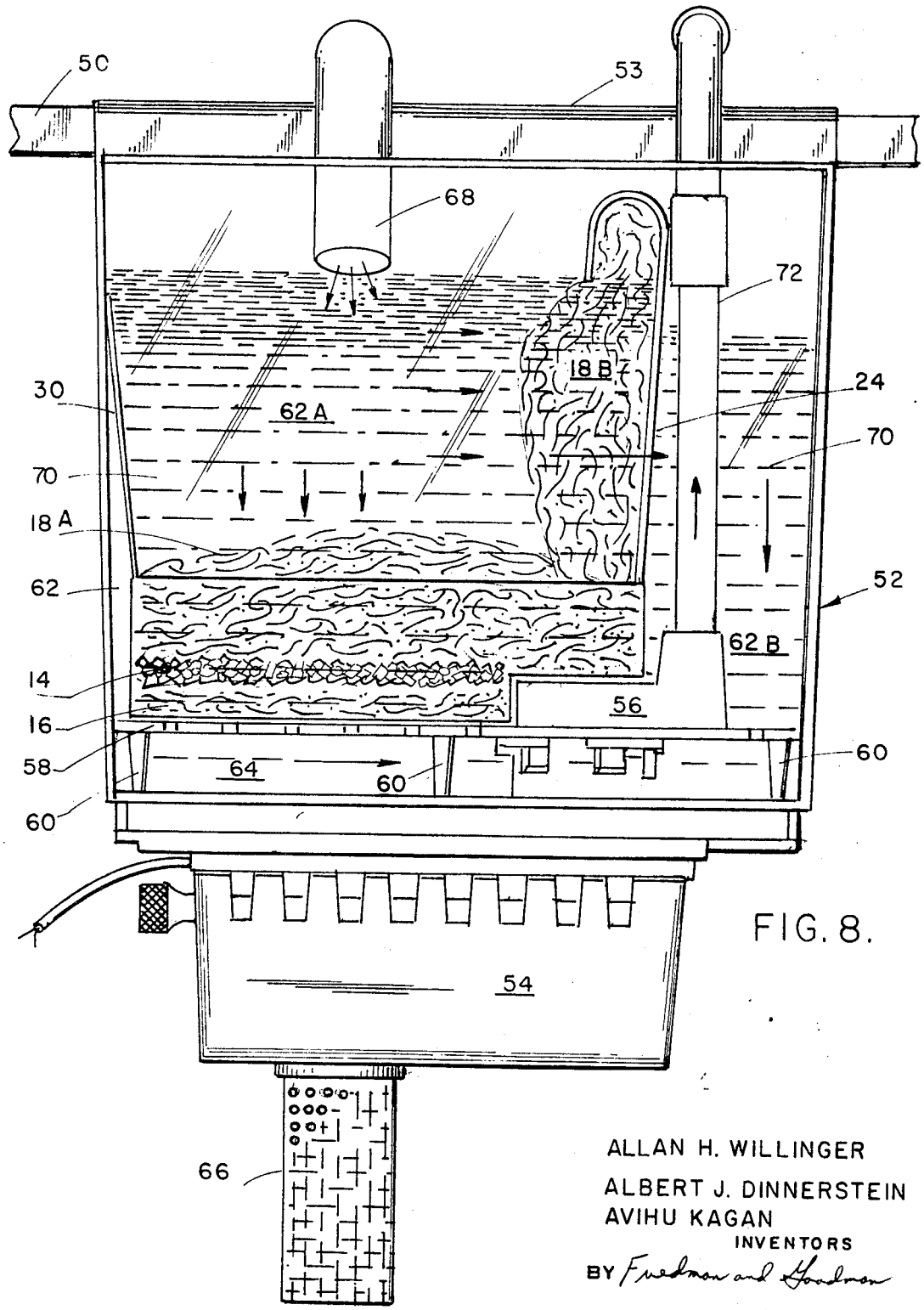
FIG. 8 illustrates a front elevational view of the association of the filtration cartridge with that of a filtration housing.

As illustrated in FIG. 8, the present invention or disposable filtration cartridge 10 is to be operatively inserted into an aquarium filtration device. As those skilled in the art readily understand, an aquarium tank or the like is generally provided with an upper ledge 50, along the side walls thereof, upon which a filtration housing 52 may be detachably restrained such as by means of a down-turned retaining lip 53 (only partially shown) which is adapted to overlie the ledge 50 of the aquarium. The filtration housing 52 is generally provided with a motor drive 54 or the like which is operatively associated with a pump 56 for pumping cleansed water from the filtration housing 52 into the aquarium upon which the filtration housing 52 rests.

In this respect, a perforated partition 58, having vertically extending lugs 60 acts to divide the filtration housing 52 into a first chamber 62 and a second chamber 64, the latter chamber extending below the partition 58. As is usually understood, a syphon tube having a lower end 66 submerged in the aquarium and an upper end 68 which is U-shaped and communicates with the first chamber 62 is utilized for syphoning debris-laden fluid or water 70 into the first chamber 62. The disposable filtration cartridge 10 is to be positioned upon the partition 58 in the first chamber 62 so as to cleanse debris-laden water as the latter water passes vertically from the first chamber 62 therethrough and into the second chamber 64 to then be emitted and returned to the aquarium through the intermediary of the pump 56 which communicates with a return tube 72, the latter which communicates with the aquarium.

Pursuant to the principals of the present invention, the disposable filtration cartridge 10 is to be inserted into the first chamber 62 of the filtration housing 52 so as to rest upon the upper surface of the partition 58 with the perforated bottom portion 20 of the casing 12 in communication with the second chamber 64 through the intermediary of the perforated partition 58. The cartridge 10 should be opened such that the tab 34 is removed from the lid 24 prior to insertion of the cartridge 10 into the first chamber 62 and, thus, in a manner as indicated above, the portions 18A and 18B of the upper filtration layer of plastic wool 18 tend to push the lid 24 into contact with the return tube 72 extending vertically in the first chamber 62 and remain in an open condition.

Moreover, when the plastic wool 18 is subjected to water in the first chamber 62, the plastic wool 18 tends to expand into a greater lateral dimension than that distance between the front and rear walls 46 and 48 respectively and contact the inner surfaces of the front and rear walls of the filtration housing 52 both along the generally vertical extent of portion 18B of the plastic wool 18 and horizontally along the portion 18A of the plastic wool 18. This lateral expansion is aided by the natural resiliency of the plastic wool.

As those skilled in the art understand, because of the additional extent of portion 18B of the plastic wool 18, the overall capacity of the plastic wool to cleanse or filter debris-laden fluid is significantly increased. Furthermore, because of the lateral expansion of the plastic wool 18 into contact with the opposite inner faces of the side walls of the filtration housing 52, again there is an additional increase in the capacity for the plastic wool 18 to cleanse or filter debris-laden fluid. Water passing through the portion 18B follows a path horizontally around the lid 24 and through the expanded extent of the portion 18B.

The provision of the portion 18B of the plastic wool 18 as it extends in the first chamber 62 of the filtration housing 52 is therefore significant in that, because of the lateral expansion thereof, into contact with the opposite inner faces of the front and rear walls of the filtration housing 52, the first chamber 62 is generally subdivided into a portion 62A and a portion 62B separated from one another through the intermediary of the portion 18B of the plastic wool 18. In this respect, as the portion 18B of the plastic wool 18 becomes clogged with debris, the horizontal water flow from the portion 62A to the portion 62B of the first chamber 62 is inhibited and, therefore, the upper surface of the water level in the portion 62B gradually begins to drop relative to the surface level in the portion 62A. The drop of the surface level of water in the portion 62B indicates to an observer that the plastic wool 18 has become excessively entrapped with particles and clogged thereby, and this drop in the water level in the portion 62B, when substantial, indicates that the plastic wool 18 requires replacement.

Accordingly, upon an indication that the plastic wool 18 and, moreover, the charcoal particles 14 and lower filtration layer 16, have become clogged and require replacement, the hobbyist simply grasps the lid 24 and closure flaps 30 and lifts the entire disposable filtration cartridge 10 upwardly and out of the first chamber 62 and, thereafter, reinserts a substitute disposable filtration cartridge 10 in a manner as was done with the original disposable filtration cartridge 10.

Clearly, the ability to remove all of the filtration elements simultaneously in one simple step from the filtration housing 52, without any requirement for tipping the filtration housing 52 so as to spill the filtration elements therefrom, is a significant advantage for the hobbyist who is often confronted with the problem of replacing debris-laden dirty and odorous filtering materials.

Moreover, the additional capacity for the filtration elements such as that of the upper filtration layer of plastic wool 18 as it laterally expands into flush contact with the opposite inner faces of the front and rear wall of the filtration housing 52, and the additional extents of the portion 18B of the plastic wool 18 are features which enhance the overall efficiency of the filtration device to cleanse debris-laden fluid.

Still a further advantage, as those skilled in the art readily understand, is associated with the portion 18B of the plastic wool 18 in that it subdivides the first chamber 62 into two chambers one of which has a water level which gradually recedes relative to the water level in the adjacent chamber for generally indicating the extent of clogging associated with the filtration elements and the time when the filtration elements must be replaced.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium filtration assembly including a receptacle in combination with an aquarium, said filtration assembly comprising a horizontally arranged perforated partition member spaced above bottom of said receptacle to define a fluid chamber between said receptacle bottom and said partition member, pumping means disposed in said receptacle in fluid communication with said fluid chamber for removing water therefrom and returning water to said aquarium, disposable filter cartridge means horizontally arranged within said receptacle above said partition member, said filter cartridge means comprising a casing provided with sidewalls extending upwardly from a bottom of said casing, a top portion of said casing pivotably connected to one of said casing sidewalls, said top portion being vertically arranged above said one casing sidewall, apertures provided in said casing bottom for passage of fluid therethrough, first filter media disposed within said casing above said apertured casing bottom and between said casing sidewalls, second filter media vertically supported against a surface of said vertically arranged casing top portion, said second filter media being disposed above and facing toward said first filter media disposed within said casing, said casing with said first filter media therein being supported by said horizontally arranged perforated partition member above said receptacle bottom with said second filter media being vertically supported by said casing top portion above said partition member, whereby fluid filtered by said first filter media and second filter media flows into said fluid chamber above said receptacle bottom and is removed from said fluid chamber by said pumping means and is returned by said pumping means to said aquarium.

2. A combination as claimed in claim 1, wherein said casing top portion terminates in a free U-shaped end portion, a portion of said second filter media being secured in said U-shaped end portion.

3. A combination as claimed in claim 1, wherein another of said casing sidewalls is provided with a pivotally displaceable flap extending outwardly from a top portion of said another casing sidewall.

4. A combination as claimed in claim 3, wherein said flap is provided with a free end tab adapted to be inserted into an aperture in said casing top portion when said casing top portion is pivotably displaced to a horizontally arranged position for maintaining said casing top portion in said horizontally arranged position.

5. A combination as claimed in claim 1, wherein said casing top portion is pivotably displaceable between said vertically arranged position and a horizontally arranged position overlying said first filter media to enclose said first filter media and second filter media within said casing.

6. A combination as claimed in claim 5, wherein said casing includes means for locking said casing top portion in said horizontally arranged position.

7. A combination as claimed in claim 1, wherein vertical edge portions of said second filter media disposed in water are in generally flush contact with a pair of opposite sidewalls of said receptacle.

* * * * *